Nov. 22, 1932.  E. E. GREVE  1,888,459
CLOSURE MEANS FOR CYLINDERS AND THE LIKE
Filed July 5, 1928
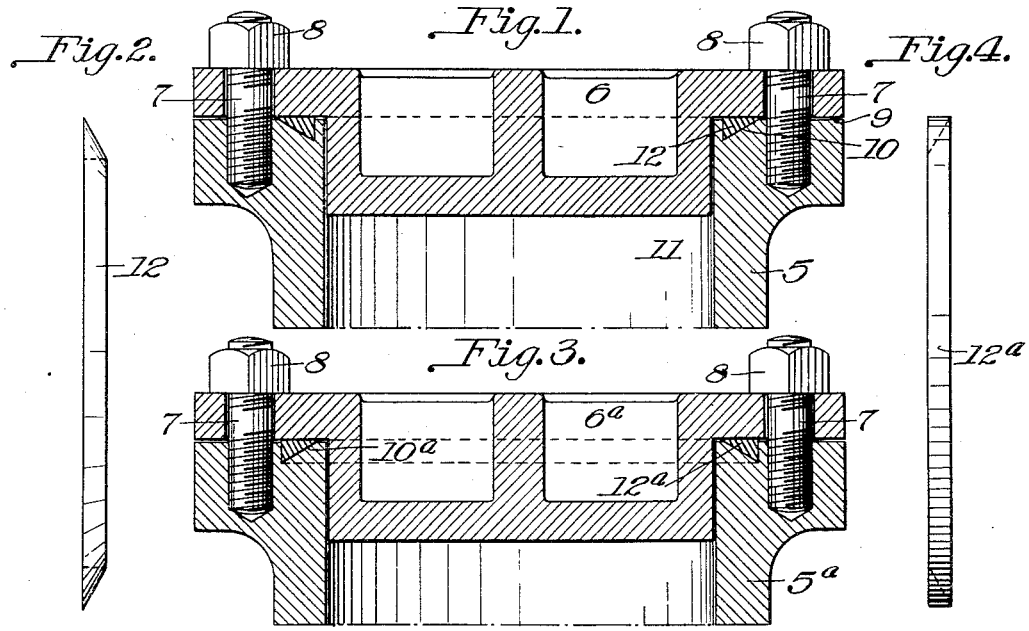
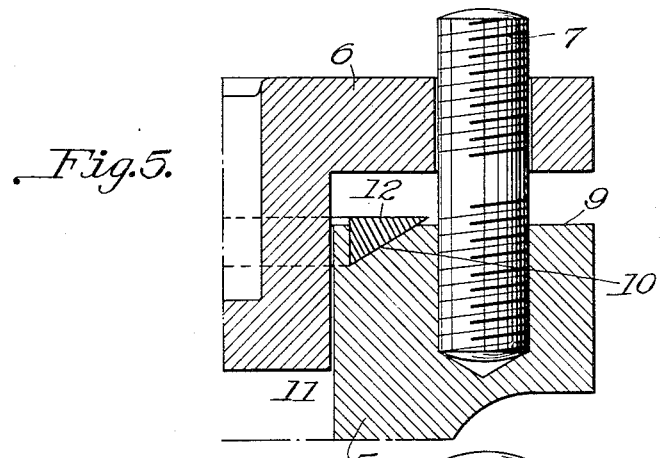
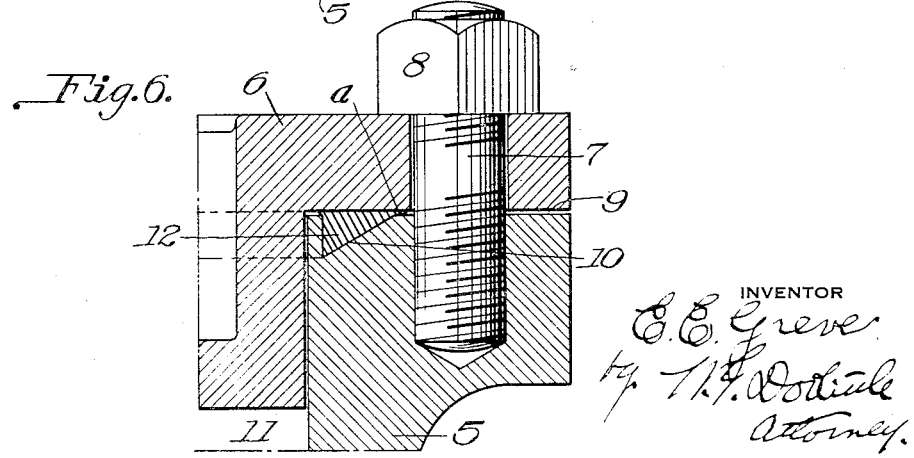
INVENTOR
E. E. Greve Patented Nov. 22, 1932

1,888,459

UNITED STATES PATENT OFFICE

EDGAR E. GREVE, OF BELLEVUE, PENNSYLVANIA, ASSIGNOR, BY MESNE ASSIGNMENTS, TO OIL WELL SUPPLY COMPANY, OF PITTSBURGH, PENNSYLVANIA, A CORPORATION OF NEW JERSEY

CLOSURE MEANS FOR CYLINDERS AND THE LIKE

Application filed July 5, 1928. Serial No. 290,456.

My invention relates to improvements in closure means for cylinders and the like, and more particularly to a closure means embodying a continuous gasket of novel shape and having cooperating novel elements to provide an efficient joint.

Among the objects of the present invention are, to provide a gasket of novel shape; a gasket comprising a continuous non-metallic ring of a particular cross section, i. e. wedge shape; and a closure structure including a member having a wedge shape gasket receiving groove, a cap member, and a gasket of wedge form in cross section disposed in the wedge shaped groove, whereby upon compression of the gasket and the application of pressure within the cylinder or member the pressure will act to wedge the gasket into tight sealing relation with its contacting walls.

In the accompanying drawing, which illustrates applications of my invention:

Fig. 1 is a sectional view of a portion of a cylinder and a closure means embodying my invention;

Fig. 2 is an edge view of a gasket of the form of Fig. 1;

Fig. 3 is a view similar to Fig. 1, showing a modified form;

Fig. 4 is an edge view of the gasket of the form of Fig. 3;

Fig. 5 is an enlarged fragmentary sectional view, showing the gasket and closure means before assembly; and Fig. 6 is a view similar to Fig. 5, in assembled position.

Referring to the drawing, 5 designates a portion of a cylinder, such as a steam or water cylinder, or it may represent a portion of the deck of a pump of the character employed in the oil fields; and 6 the cap or head therefor; said parts being secured together by any suitable means, as by studs 7 and nuts 8. Studs 7 are disposed at suitable intervals in the outer face 9 of member 5.

As illustrated and as preferred, a circular wedge-shaped gasket receiving groove or seat 10 is formed in the face 9, adjacent the bore 11 of the cylinder; the shape of seat 10 is shown particularly by the enlarged detail view, Fig. 5, and as there shown the inner wall of said groove or seat is vertical and has its depth decreasing uniformly towards its outer periphery.

Disposed in the groove or seat, is a gasket 12; this gasket constitutes an important and characteristic feature of my invention and comprises a continuous non-metallic ring of wedge-shape in cross-section, the thick part of said cross-section being at the inner periphery of the gasket with its thick edge designed to contact with the vertical wall of the groove 10. In practice the gasket is of slightly greater cross-sectional area than the area of its receiving groove and consequently projects upwardly a slight distance from the surface 9.

Upon threading cap 6 over studs 7 and tightening the nuts 8, the gasket is compressed and assumes the configuration shown in Fig. 6. A small amount of clearance is provided between cap 6 and face 9. Due to the compression of the gasket, it will be firmly seated in the groove 10 and will have a tendency to expand. On account of the particular cross-section, this expansion will wedge the outer periphery of the gasket into the clearance between the head and the face 9, as indicated at $a$.

When pressure is obtained within the cylinder, it will contact with the inner thick portion of the gasket, thus causing a further wedging action, resulting in a perfect joint.

In the form of Figs. 3 and 4, I have shown a modified form of gasket as applied to a vacuum cylinder. Thus, groove or seat $10a$ and its gasket $12a$ are located similarly to the form of Fig. 1, but with the vertical wall of the groove and the thick portion of the gasket at the outer periphery thereof. Tightening the cap $6a$ to the cylinder $5a$ will wedge the gasket around its inner periphery. Since there is a negative pressure within and a positive pressure without the cylinder, there will be a tendency to wedge the gasket inwardly forming a perfect seal.

It will be understood that the use of my invention is not limited to cylinders but may be used wherever such a gasket is applicable.

I claim:

1. The combination with a cylinder or the like having a wedge-shape gasket receiving groove formed in a base thereof adjacent the bore, said groove having a vertical inner wall, a cap, a continuous non-metallic ring gasket of wedge-shape in cross-section entered in the groove with its inner thick portion in contact with the said wall, and means for securing the cap to the cylinder, said gasket arranged to effect a wedging action upon application of pressure thereto by the cap and a further wedging action by pressure within the cylinder.

2. The combination with a cylinder or the like having a wedge-shape gasket receiving groove formed in a face thereof adjacent the bore, a cap, a continuous non-metallic ring gasket of wedge-shape in cross-section entered in the groove, and means for securing the cap to the cylinder, said gasket having its tapered edge at its outer periphery and disposed between the inner face of the cap and the upper face of the cylinder, whereby initial wedging action of the gasket is effected by tightening the cap and a further wedging action is effected by pressure within the cylinder and the like.

3. In combination, a member having a bore and a wedge-shaped groove in an end surrounding the bore, said wedge-shaped groove having its inner wall vertical and an inclined wall extending from the inner wall substantially to the end of the member, a cap, a continuous ring gasket of wedge-shape in cross-section entered in the groove, and means for clamping the cap against the ring gasket to wedge the same in sealing relation with the member.

In testimony whereof I affix my signature.

EDGAR E. GREVE.